United States Patent
Schmid et al.

(10) Patent No.: US 7,127,893 B2
(45) Date of Patent: Oct. 31, 2006

(54) INTERNAL COMBUSTION ENGINE COMPRISING A COMPRESSOR IN THE INDUCTION TRACT

(75) Inventors: Wolfram Schmid, Nürtingen (DE); Siegfried Sumser, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/086,783

(22) Filed: Mar. 22, 2005

(65) Prior Publication Data

US 2005/0188693 A1   Sep. 1, 2005

Related U.S. Application Data

(63) Continuation-in-part of application No. PCT/EP2003/009720, filed on Sep. 2, 2003.

(30) Foreign Application Priority Data

Sep. 25, 2002   (DE) ................................ 102 44 535

(51) Int. Cl.
*F02B 37/00* (2006.01)
*F02B 37/02* (2006.01)
*F02M 25/07* (2006.01)

(52) U.S. Cl. ................ 60/605.2; 123/568.29; 123/DIG. 124; 415/158

(58) Field of Classification Search ........... 60/605.2; 123/568.29, DIG. 124; 415/157–164
See application file for complete search history.

(56) References Cited

U.S. PATENT DOCUMENTS 6,301,889 B1   10/2001   Gladden et al. ........... 60/605.2

FOREIGN PATENT DOCUMENTS

| DE | 42 13 047 | 10/1983 | |
| DE | 197 28 353 | 9/1998 | ............... 60/605.2 |
| DE | 198 33 134 | 11/1999 | |
| DE | 199 55 508 | 4/2001 | ............... 60/605.2 |
| DE | 100 49 198 | 4/2002 | ................ 60/611 |
| DE | 10116643 A1 | * 10/2002 | |
| JP | 04 112957 | 4/1992 | |
| JP | 06147026 A | * 5/1994 | |
| JP | 06147027 A | * 5/1994 | |
| JP | 08109856 A | * 4/1996 | |
| JP | 09151805 A | * 6/1997 | |

* cited by examiner

*Primary Examiner*—Thai-Ba Trieu
(74) *Attorney, Agent, or Firm*—Klaus J. Bach

(57) ABSTRACT

In an internal combustion engine which includes in the intake section a compressor with an impeller that is mounted rotatably in a compressor intake passage, the compressor includes an additional passage which opens out into the compressor intake passage and through which a mass flow of exhaust gas can be transferred from the exhaust section into the intake section via an exhaust-gas recirculation device, the exhaust gas recirculation line of the exhaust-gas recirculation system of the engine being connected to the additional passage extending directly to the compressor.

8 Claims, 2 Drawing Sheets

INTERNAL COMBUSTION ENGINE COMPRISING A COMPRESSOR IN THE INDUCTION TRACT

This is a Continuation-In-Part application of International Application PCT/EP2003/009720 filed Sep. 2, 2003 and claiming the priority of German application 102 44 535.4 filed Sep. 25, 2002.

BACKGROUND OF THE INVENTION

Document DE 199 55 508 C1 describes a supercharged internal combustion engine with an exhaust-gas turbocharger which comprises in the exhaust section of the engine an exhaust-gas turbine with a variably adjustable turbine geometry, and in the induction section a compressor, which is driven via a shaft of the exhaust-gas turbine and by means of which induction combustion air is compressed to an elevated boost pressure. The active turbine inlet cross section in the exhaust-gas turbine can be variably controlled by means of the variable turbine geometry, thereby providing the option of providing for different flow conditions in the exhaust-gas turbine for different load and operating states of the internal combustion engine so as to achieve optimum power both in engine operating mode and in engine braking mode.

An additional passage is formed in the compressor of the exhaust-gas turbocharger, extending approximately parallel to the axial compressor intake passage, in which the compressor impeller is rotatably mounted. The additional passage opens out into the compressor intake passage from the radially outer side adjacent the compressor impeller, so that combustion air which is supplied via the additional passage impinges on the compressor impeller blades and applies a driving torque to the compressor impeller. As a result, it is possible for the compressor to be operated in turbine mode in certain operating states of the internal combustion engine—in particular at low engine load and low engine speed. With additional rotary energy then being supplied to the compressor impeller, fluctuations in the speed of the compressor can be reduced. However, this intervention into the limiting of the fluctuations of the rotational speed of the exhaust-gas turbocharger is restricted to the lower load and speed ranges of the internal combustion engine, when the induction pressure in the induction section downstream of the compressor is lower than the ambient pressure, resulting in the pressure differential required for the impeller to operate as a turbine.

Furthermore, the internal combustion engine which is disclosed in DE 199 55 508 C1 is provided with an exhaust-gas recirculation device, which comprises a recirculation line between the exhaust section upstream of the exhaust-gas turbine and the induction section downstream of the compressor. An adjustable blocking valve is arranged in the recirculation line, and this valve can be opened in operating states in which the exhaust-gas back pressure exceeds the induction pressure, so that a mass flow of exhaust gas can be passed into the induction section. This makes it possible to reduce the nitrogen oxides, in particular when the internal combustion engine is operating under partial load.

A further supercharged internal combustion engine with exhaust-gas recirculation is described in DE 198 33 134 C1. A gas store can be used to store exhaust gas from the exhaust section and feed it into the induction section upstream of the compressor on demand, so that in addition to reducing nitrogen oxide, it is also possible to provide additional driving energy for the compressor impeller, whereby the fluctuations in rotational speed of the exhaust-gas turbocharger can be reduced further. When the pressurized exhaust gas flows onto the compressor impeller in the axial direction, however, it should be borne in mind that the compressor impeller blades are designed to compress the mass flow supplied, with the result that kinetic energy of the compressor impeller is converted into potential energy of the gas volume downstream of the compressor. On the other hand, in turbine mode of the compressor, the kinetic energy of the incoming mass flow can only be converted into driving energy for the compressor impeller to an insufficient extent, since the compressor impeller blades are not optimized for turbine operation.

Document DE 42 13 047 A1 discloses a compressor for an internal combustion engine, which to broaden the compressor characteristic diagram has what is described as a characteristic diagram-stabilizing measure (CDSM), which shifts the pump limit in the compressor characteristic diagram toward lower mass flows. The CDSM is realized by providing a circulation chamber in the compressor intake passage, which circulation chamber extends coaxially with respect to the compressor intake passage but is separated from the latter by means of a contour ring, the circulation chamber being in communication with the compressor intake passage in the region of both its end sides. The circulation chamber, which extends axially beyond the rotor inlet plane of the compressor impeller, has the function of returning a partial mass flow that has been fed to the compressor impeller counter to the main flow direction and then reintroducing it into the main flow in the compressor intake passage. This produces an annular flow which effects the shift in the pump limit. To enable the annular flow to form, the contour ring is made relatively short in the axial direction and has relatively large flow openings in the region of its two end sides.

To create an enlarged buffer volume, the circulation chamber can be connected to various gas-containing components of the internal combustion engine, for example to the crankcase, the air filter or the exhaust-gas recirculation. In any event, it is an object of this additional connection to increase the volume of the circulation chamber. This additional buffer volume alleviates the effect of pressure surges.

It is the object of the present invention to improve the efficiency and operational reliability of supercharged internal combustion engines. It is intended in particular to achieve lower fluctuations in rotational speed in the exhaust-gas turbocharger of the internal combustion engine.

SUMMARY OF THE INVENTION

In an internal combustion engine which includes in the intake section a compressor with an impeller that is mounted rotatably in a compressor intake passage, the compressor includes an additional passage which opens out into the compressor intake passage and through which a mass flow of exhaust gas can be transferred from the exhaust section into the intake section via an exhaust-gas recirculation device, the exhaust gas recirculation line of the exhaust-gas recirculation system of the engine being connected to the additional passage extending directly to the compressor.

The fact that the additional passage is formed separately and sealed in particular in a pressure-tight and flow-tight manner with respect to the axial compressor intake passage allows the exhaust gases from the exhaust section to flow to the compressor impeller in a targeted manner, such that an angular momentum is imparted to the compressor impeller blades and the exhaust-gas energy can be more effectively converted into rotary energy of the compressor impeller. The exhaust-gas recirculation serves as a driving source for the compressor impeller, whereby the efficiency is improved significantly compared to designs which are known from the prior art, on account of the more targeted flow of the exhaust gas onto the compressor impeller.

Since the exhaust gas being fed directly into the additional passage of the compressor, the advantage of nitrogen oxide reduction as a result of the exhaust-gas recirculation is combined with the advantage of a reduction in the fluctuations of the rotational speed of the exhaust-gas turbocharger. The exhaust-gas recirculation into the additional passage is carried out to an increased extent in particular in operating states of the internal combustion engine with low loads and/or engine speeds, when, with a low induction pressure in the induction section, there is a pressure difference assisting exhaust-gas recirculation flow from the exhaust section to the induction section. In the low load/speed range of the internal combustion engine, in which the induction pressure is below the ambient pressure, combustion air can be fed in via the additional passage in addition to the exhaust gas, and, because of the pressure difference between ambient pressure and boost pressure, this combustion air applies a driving angular momentum to the compressor impeller, so that the compressor impeller is operated in turbine mode, This operation can also be referred to as cold air turbine operation.

In accordance with a preferred refinement, in the region where the additional passage opens out into the compressor intake passage there is a swirl device, by means of which a swirl is imparted to the mass flow supplied via the additional passage, and the mass flow impinges on the compressor impeller with this swirl, allowing better conversion of the kinetic energy of the mass flow supplied into rotary energy of the compressor impeller. The swirl device may expediently be adjustable, such that it can be adjusted between an open position, maximizing the open cross section, and a closed position, blocking off the opening cross section. By controlling the swirl device, it is possible to regulate the mass flow of exhaust gas flowing through the additional passage, so that in principle there is no need for an exhaust-gas recirculation valve in the exhaust-gas recirculation line. On the other hand, however, it may be expedient for an exhaust-gas recirculation valve of this type to be provided in addition to the adjustable swirl device, which offers the advantage that it is possible to set operating states in which the recirculation of exhaust gas into the exhaust section is suppressed, but at the same time combustion air is passed via the additional passage to the compressor impeller, and the compressor is operated in cold-air turbine mode.

However, it is also possible to provide a fixed swirl device without the adjustment option in the region of the opening of the additional passage into the compressor intake passage. In this case, it is expedient for the exhaust-gas mass flow to be regulated by means of an adjustable exhaust-gas recirculation valve.

The additional passage is advantageously radially outwardly offset with respect to the compressor intake passage, extending parallel to the latter. The region where it opens out is expediently located axially in the region of the compressor impeller, with the additional passage in particular opening out radially into the compressor intake passage, so that the mass flow passed through the additional passage impinges on the compressor impeller, so as to utilize the swirl generated by the swirl device, in a manner which transmits an angular momentum to the compressor impeller.

In the case of an adjustable swirl device, this expediently comprises a stationary swirl vane structure which covers the opening region, and an adjustable axial slide, which can be introduced into the opening region and thereby closes off the flow cross section.

The compressor is preferably part of an exhaust-gas turbocharger, wherein the exhaust-gas turbine, if appropriate, is equipped with a turbine vane structure that can be variably adjusted in order to set the turbine inlet flow cross section. In principle, however, it is also possible for the compressor to be driven independently of an exhaust-gas turbine, for example by an electric motor. In this case, there is no need for an exhaust-gas turbine.

Further advantages and expedient embodiments will be described below on the basis of the accompanying drawings:

DESCRIPTION OF A PREFERRED EMBODIMENT OF THE INVENTION

Figure 1:
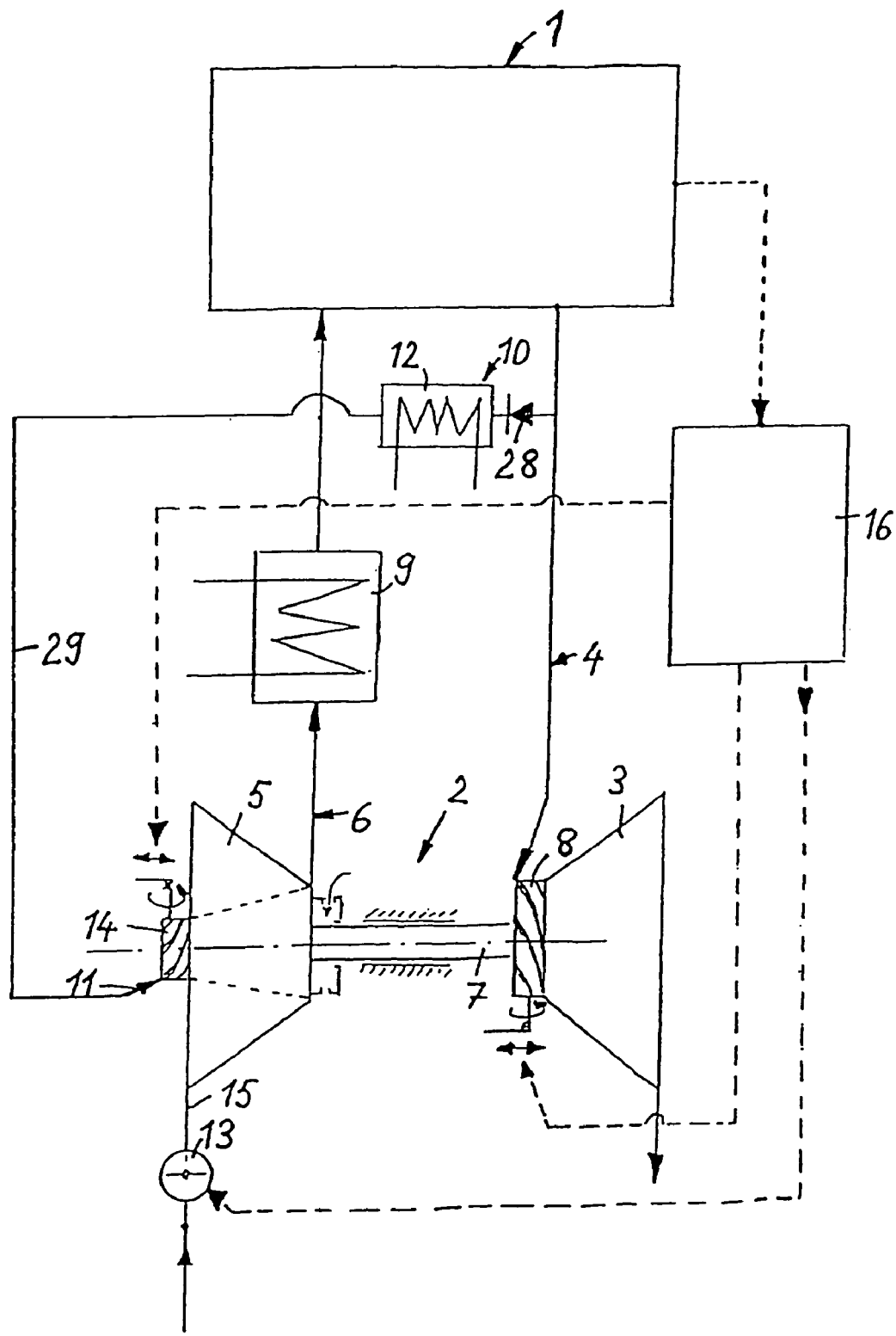
FIG. 1 shows in a diagrammatic view a compressor supercharged internal combustion engine with an exhaust-gas recirculation device, the recirculation line of the exhaust-gas recirculation device being connected to an additional passage of the compressor.

The internal combustion engine 1 illustrated in FIG. 1 is a spark-ignition engine or alternatively a diesel internal combustion engine. The internal combustion engine 1 is provided with an exhaust-gas turbocharger 2 having an exhaust-gas turbine 3 in the exhaust section 4 and a compressor 5 in the induction section 6, the compressor impeller of which compressor is connected via a shaft 7 to the turbine wheel, which is driven by the pressurized exhaust gases in the exhaust section between internal combustion engine 1 and the exhaust-gas turbine 3. The exhaust-gas turbine 3 is equipped with a turbine inlet guide vane structure 8 which can be set variably and by means of which the active turbine inlet cross section can be adjusted as a function of state and operating variables of the internal combustion engine and the other units assigned to the internal combustion engine.

The combustion air which is drawn in by the compressor 5 and compressed to an elevated pressure is cooled downstream of the compressor in a charge-air cooler 9 and then fed at the boost pressure to the cylinders of the internal combustion engine 1.

Furthermore, there is an exhaustgas recirculation device 10, which comprises a recirculation line 29 connected to between the exhaust section 4 upstream of the exhaust-gas turbine 3 and an induction section, with a heat exchanger 12 and a recirculation valve 28 being arranged in the recirculation line 29. The recirculation valve 28 may be a controllable valve which can be adjusted between a blocking position and an opening position, or else may be a passive valve that cannot be adjusted, for example a butterfly valve. The recirculation line 29 extends to an additional passage 11, which is part of the compressor 5 and in particular is formed in the housing of the compressor. The additional passage 11 opens out into the axial compressor intake passage 18, in which the compressor impeller 19 is mounted rotatably. In the inlet region surrounding the impeller where the additional passage 11 opens out into the compressor intake passage 18 there is arranged a swirl vane structure 14, which applies a swirl to the exhaust-gas mass flow supplied, so that the mass flow impinges on the compressor impeller in the compressor intake passage while it is subject to this swirl, thereby imparting a driving angular momentum to the compressor impeller 19.

During normal operation of the compressor 5, combustion air is fed to the latter from the environment via a line section 15, the line section 15 opening out into the compressor intake passage 18. The line section 15 may also form part of the compressor intake passage. An adjustable blocking member 13, for example a throttle valve, which can be used to regulate the combustion air flow to be fed into the compressor 5, is arranged in the line section 15.

It may be expedient for a bypass line to branch off into the additional passage 11 from the line section 15 upstream of the compressor 5, so that combustion air can also be fed to the additional passage 11 in addition and/or as an alternative to the exhaust gases. This bypass line can advantageously likewise be regulated by means of a controllable blocking member.

Furthermore, the internal combustion engine 1 is provided with a control unit 16, which can be used to control the adjustable units of the internal combustion engine variable turbine geometry 8, swirl vane structure 14, blocking member 13 and if appropriate the recirculation valve 28.

Figure 2:
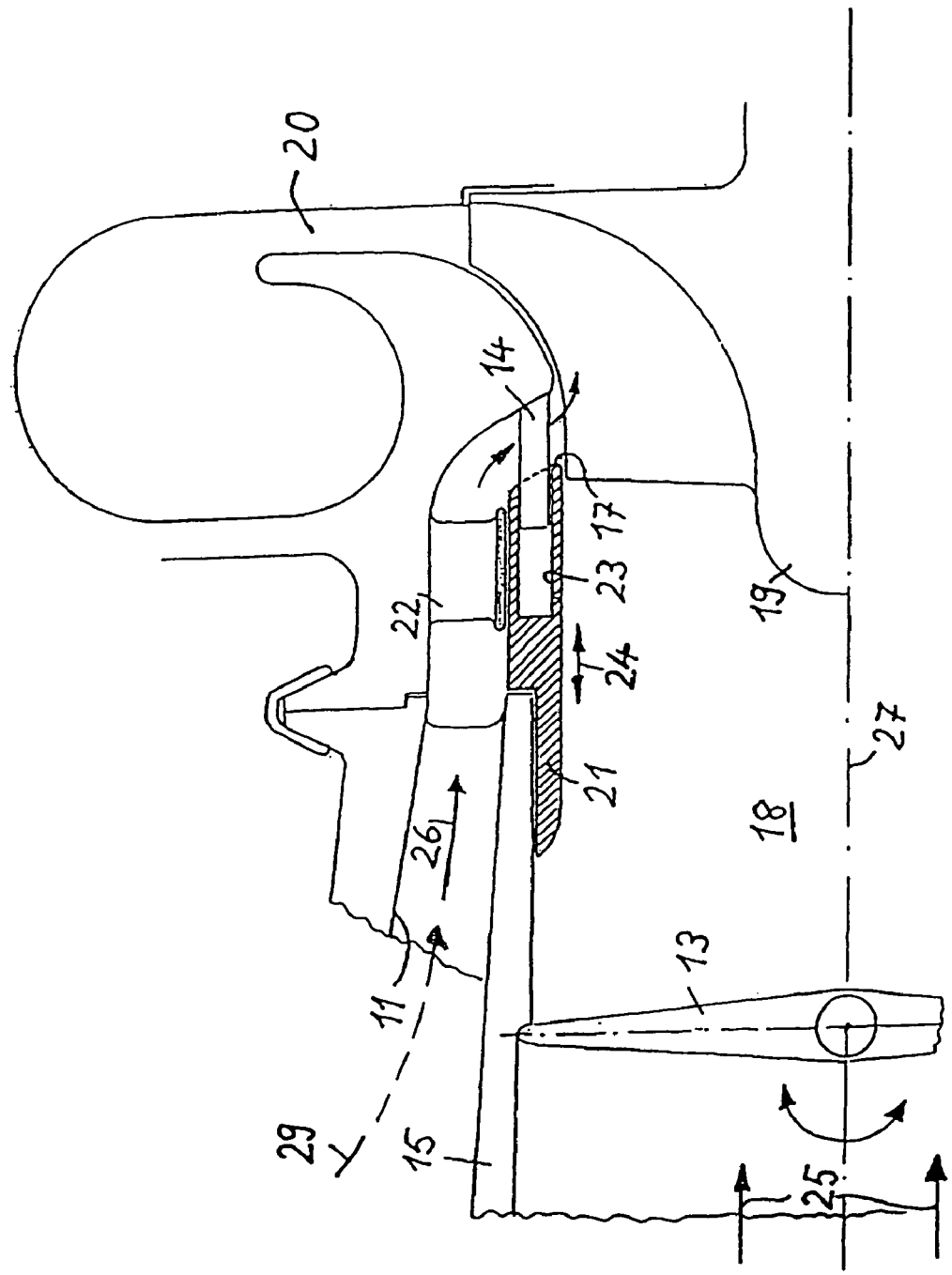
FIG. 2 shows a section through the compressor with an axial compressor intake passage, in which a compressor impeller is arranged, and a radially outer additional gas supply passage is provided.

It can be seen from the sectional illustration presented in FIG. 2 that the combustion air is introduced axially, as indicated by arrow 25, into the compressor intake passage 18, in which the controllable blocking member 13 is located and, moreover, the compressor impeller 19 is rotatably mounted. After it has passed through the compressor impeller 19, the compressed combustion air is passed radially into a diffuser 20, from which the combustion air is conducted to the charge-air cooler in the induction section in order to be cooled and is then fed to the cylinders of the internal combustion engine.

The additional passage 11 extends approximately parallel to the compressor intake passage 18 but is offset in the radially outward direction with respect to the compressor intake passage 18. The exhaust gas supplied, and if appropriate also combustion air, flows out of the exhaust-gas recirculation line 29 via the additional passage 11 in the direction indicated by the arrow 26. The additional passage 11 opens out into the compressor intake passage 18 adjacent the compressor impeller 19, with the additional passage 11 being radially oriented in the opening region 17, so that the mass flow which is supplied impinges on the compressor impeller blades substantially radially and therefore approximately normally with respect to the longitudinal axis 27 of the compressor.

To increase the angular momentum that can be transferred to the compressor impeller, a swirl vane structure 14 is arranged in the opening region 17, imparting an additional swirl to the mass flow supplied via the additional passage 11 when it flows through the swirl vane structure 14. The swirl vane structure 14, together with an axial slide 21, forms an adjustable swirl device, by means of which the opening cross section can be adjusted between an open position and a closed position, with the flow cross section expediently being completely blocked in the closed position. The axial slide 21 is held slideably on a bearing element 22 and can be displaced between its open position and its closed position as indicated by the arrow 24. In the region of one axial end side, the axial slide 21 has a receiving opening 23, in which the swirl vane structure 14 is received in the closed position of the axial slide 21.

What is claimed is:

1. An internal combustion engine having an intake section (6), a compressor (5) disposed in the intake section (6), a compressor impeller (19) rotatably supported in the compressor (5), the compressor (5) including an intake passage (18) by means of which combustion air is supplied to the compressor to be compressed therein to an elevated boost pressure, and an additional passage (11) formed separately and sealed off in a pressure-tight and flow-tight manner with respect to the axial compressor intake passage (18), the additional passage (11) being connected to the compressor intake passage (18) in an area surrounding the compressor impeller (19) at its upstream end, and an exhaust gas recirculation device (10) having a recirculation line (29) connected to the additional passage (11) for conducting an adjustable mass flow of exhaust gas from the exhaust section (4) of the engine into the intake section (6), such that the re-circulated exhaust gas is admitted directly to the impeller (19) while applying a swirl force to the impeller (19) of the compressor (5).

2. The internal combustion engine as claimed in claim 1, wherein a swirl vane structure (14, 21) is arranged in the flow passage (17) where the additional passage (11) opens out into the compressor intake passage (18) for controlling the swirl force applied to the impeller (19).

3. The internal combustion engine as claimed in claim 2, wherein the swirl vane structure (14, 21) is of adjustable design.

4. The internal combustion engine as claimed in claim 3, wherein the swirl vane structure comprises a swirl grate disposed in the opening region (17), and an axial slide (21), which is movable between an open position and a closed position in which the swirl plate (21) blocks the flow passage (17).

5. The internal combustion engine as claimed in claim 4, wherein a receiving recess (23) for receiving the swirl vane structure (14) is formed in the end side of the axial slide (21).

6. The internal combustion engine as claimed in claim 1, wherein an adjustable blocking member (13) is arranged in the compressor intake passage (18) upstream of the compressor impeller (19).

7. The internal combustion engine as claimed in claim 1, wherein a recirculation valve (28) is arranged in the exhaust-gas recirculation line (29).

8. The internal combustion engine as claimed in claim 1, wherein the compressor (5) is part of an exhaust-gas turbocharger (2), including an exhaust-gas turbine (3) which is equipped with a variable turbine geometry (8) in order to variably control the active turbine inlet cross section.

* * * * *